Nov. 3, 1953 J. R. NEUBAUER 2,658,172
SWITCHING CONTROL SYSTEM
Filed Sept. 20, 1951
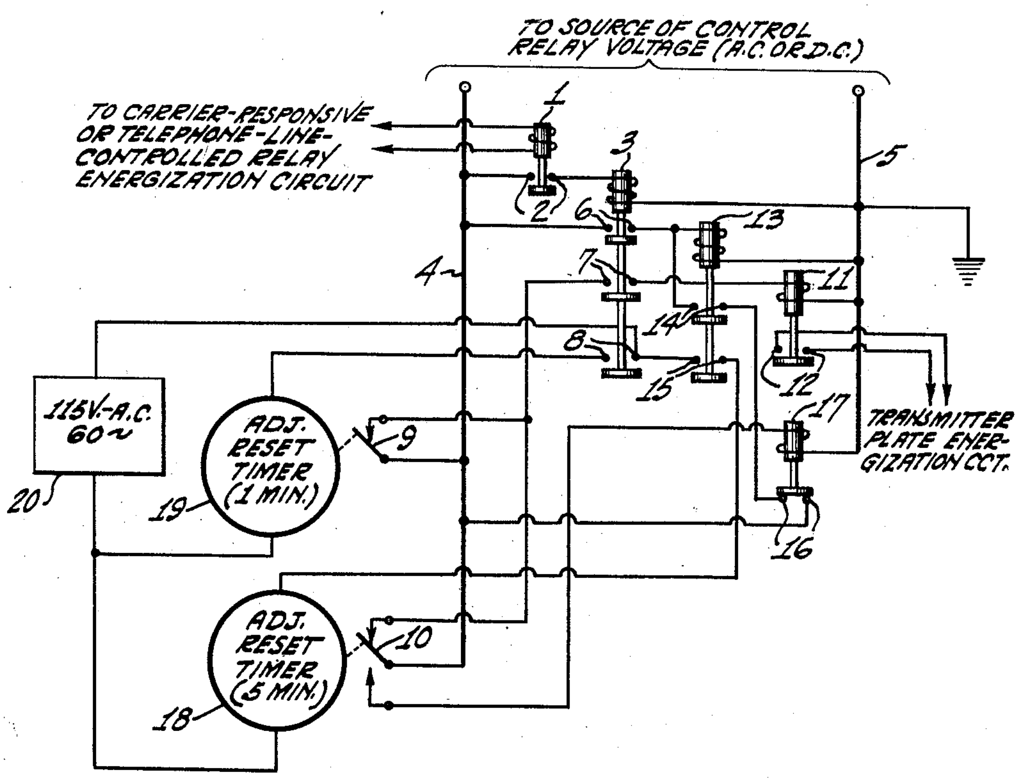
INVENTOR
JOHN R. NEUBAUER
BY
Charles H. Brown
ATTORNEY Patented Nov. 3, 1953

2,658,172

UNITED STATES PATENT OFFICE 2,658,172

SWITCHING CONTROL SYSTEM

John R. Neubauer, Collingswood, N. J., assignor to Radio Corporation of America, a corporation of Delaware Application September 20, 1951, Serial No. 247,532

10 Claims. (Cl. 317—141)

This invention relates to a control system for a radio transmitter, and more particularly to a control system for an unattended radio transmitter such as might be used in mobile communications equipment.

Generally, a mobile communications system may include one or more remotely located, unattended radio transmitters which are controlled to radiate a carrier in response to the operation of a "push-to-talk" switch at the point where the desired intelligence is originating and which, when so controlled or energized, function to relay or repeat the intelligence to a distant point. Such unattended radio transmitters are controlled by a sensitive control relay which may be energized by received carrier energy derived from a radio receiver or by a direct current telephone line relay, said sensitive control relay in turn acting to energize the plate power relay of the controlled transmitter to cause such transmitter to radiate carrier energy which may then be modulated by the intelligence to be relayed.

On some occasions, the sensitive control relay at the transmitter may fail to deenergize or it may become energized in response to control signals not originated by the normal controlling source. The failure or improper functioning of the control relay may not be permanent or of such a nature as to require repair. For example, the carrier-operated relay could become continuously energized in response to a spurious signal being radiated by a diathermy device or in response to harmonic radiation from a nearby broadcast transmitter, or the telephone-line-controlled relay could be continuously energized in response to a spurious voltage as a result of a shorted or leaking telephone cable. Thus, the control relay at the unattended transmitter may become continuously energized due to circuit failure or to a spurious control signal, and if this occurs such transmitter will continuously radiate carrier energy.

Continuous uncontrollable radiation of carrier energy by a transmitter, which cannot be stopped by the operator at the dispatching or control point, is undesirable in radio communication systems having several other units operating on the same channel, since such continuous radiation of the carrier renders it very difficult, if not impossible, for these other units to operate properly. Also, if the transmitter is part of a chain of relay or repeating stations, continuous radiation would disable all units. Then too, the transmitter may be located at a point which would require considerable time to travel to, in order to remedy improper control relay functioning thereat; this can be a large factor in systems located in large undeveloped areas. For all of the above reasons, it is highly advantageous to utilize an arrangement at an unattended controllable radio transmitter, which will prevent such a transmitter from continuously radiating due to failure of the control device or due to control signals not originated by the normal controlling source.

An object of this invention is to devise a novel automatic control circuit for a transmitter, which will limit the time interval that such transmitter can continuously radiate carrier energy.

Another object is to provide a circuit which will prevent an unattended radio transmitter from continuously radiating carrier energy in response to abnormal causes, but which will automatically restore the transmitter to service if the abnormal causes cease to exist or are removed.

A further object is to devise a control circuit condition sampling device which at the end of a predetermined time interval determines whether or not the control circuit is normal, and then goes on to produce different results corresponding to the normality or abnormality of the control circuit.

The foregoing and other objects of the invention will be best understood from the following description of an exemplification thereof, reference being had to the accompanying drawing, wherein the single figure is a schematic representation of a circuit according to this invention.

Briefly, the objects of this invention are accomplished in the following manner: A circuit condition sampling device, including a timer, allows a predetermined interval of time to elapse from the initiation of transmission by a transmitter, at the end of which interval the device determines, by means of a relay circuit, whether the transmitter control circuit is normal. If such circuit is normal, the sampling device resets for a new cycle without interrupting any control functions of the transmitter. Should the control circuit be "locked on" at the end of this interval, however, the sampling device interrupts the circuit of the transmitter plate voltage relay and maintains the transmitter off until the control circuit is released.

Now referring to the single figure of the drawing, the relay 1 is a sensitive control relay located at the unattended radio transmitter, at which all of the circuitry illustrated in the figure is located. As indicated in the drawing, relay 1 may be energized either by a carrier-responsive energization circuit or a telephone-line-controlled energization circuit. In either case, "push-to-talk" or manual operation by the station operator at a remote point causes energization of relay 1. If the control path between the remote point and the unattended transmitter is a radio carrier link, in which case the energization of relay 1 is effected in response to the presence of a carrier at the unattended transmitter, a relay energization circuit such as disclosed in my co-pending joint application, Serial No. 222,504, filed April 23, 1951, may be used. If the control path between the remote point and the unattended transmitter is a telephone line, a high resistance direct current relay may be used for energization of relay 1, this direct current relay being connected at the terminating (transmitter) end of the telephone line, between the center taps of the line-terminating transformer. In this case, the remote control unit would apply a unidirectional potential from the remote control point, which potential would travel down the two sides of the line and energize the direct current relay. This latter relay would then, in turn, energize the sensitive relay 1 of the transmitter.

When the relay 1 is energized in response to a manual operation by the operator at the remote operating point, its normally-open contacts 2 are closed to connect the coil of relay 3 across the two buses 4 and 5, which are supplied from a suitable source (not shown) of control relay voltage, bus 4 being connected to one terminal of such source and bus 5 being connected to the other terminal thereof. Bus 5 may be grounded, as shown. Buses 4 and 5 may be supplied with either alternating or direct current, as dictated by design considerations. In a typical example, these buses were connected to opposite sides of a 6.3-volt, alternating current source. When contacts 2 are closed, relay 3 is energized to close its three pairs of normally-open contacts 6, 7 and 8. Closure of contacts 7 completes a circuit through contacts 9 and 10 (which contacts are normally closed in the positions illustrated and in such positions are in parallel with each other) from bus 4 through the coil of relay 11 to bus 5, thus energizing relay 11.

Energization of relay 11 closes its normally-open contacts 12, which are in series in the plate energization circuit of the transmitter; this applies plate voltage to the transmitter, causing it to radiate carrier energy. Thus, energization of relay 1 normally causes energization of the transmitter through energization of relay 3; the normal carrier-on and carrier-off control functions in the transmitter are thus transferred from the relay 1 to the relay 3.

Closing of contacts 6 of relay 3 causes energization of relay 13 through an obvious circuit, relay 13 then closing its two pairs of normally-open contacts 14 and 15. Closing of contacts 14 (one of which is connected to the upper end of the coil of relay 13) completes a circuit through the normally-closed contacts 16 of relay 17 to bus 4, thus providing a holding circuit for relay 13, independent of contacts 6, as follows: bus 5, coil of relay 13, closed contacts 14, closed contacts 16, bus 4.

Closing of contacts 15 of relay 13 completes an obvious circuit from the 115-volt alternating current source 20 to the adjustable reset timer 18, to start this timer or timing clock. An adjustable reset timer is designed to complete any preset time interval (five minutes for timer 18), at the end of which it operates a switch and holds the same in its operated position as long as alternating current is applied to the timer. The switch operated by timer 18 is the single-pole double-throw switch 10, which is illustrated in its unoperated position. In its operated position, the movable arm of switch 10 engages its lower fixed contact and is spaced from its upper fixed contact. When the alternating current is removed from the timer, the holding clutch in the timer releases and the timing mechanism returns to its original position, restoring the switch to its normal unoperated position illustrated.

Since relay 13, once it is energized, remains energized through its own holding circuit irrespective of any subsequent de-energization of relays 1 and 3, reset timer 18 will run continuously to the end of its five-minute cycle (the "given interval of time" of the circuit condition sampling arrangement), at which time switch 10 is operated by said timer to open its upper fixed contact and close its lower fixed contact. The opening of the upper contact of 10 will (but only if the parallel contacts 9 are also open at this time) interrupt the circuit to the transmitter plate voltage relay 11, thus de-energizing the transmitter. The closing of the movable arm of 10 on its lower contact completes an obvious circuit to the coil of relay 17, energizing this relay and opening its normally-closed contacts 16.

If the control circuit including relays 1 and 3 is normal at this time, that is, if the sensitive control relay 1 is not holding relay 3 closed, the holding circuit of relay 13 is broken at contacts 16 and relay 13 is de-energized to open its contacts 14 and 15. The opening of contacts 15 breaks the circuit from the alternating current source to reset the timer 18, removing the voltage from this timer so that switch 10 is restored to its normal, original, illustrated position. Closing of the arm of switch 10 on its upper contact restores this portion (through contacts 10, which are in parallel with contacts 9) of the circuit to the transmitter plate voltage relay 11, while opening of the lower contact of 10 de-energizes relay 17 to re-establish the holding circuit for relay 13.

Thus, if the control circuit is normal, the sampling circuit of this invention resets for a new cycle without interrupting any control functions of the transmitter (it will be recalled that these control functions are effected mainly by way of relays 1 and 3).

If the control circuit is "locked on", however, that is, if the control relay 1 continues to hold relay 3 energized at the end of the cycle of timer 18, which occurs five minutes after relay 13 first closes its contacts 15, relay 13 is not released or de-energized by the opening of contacts 16 at this time as a result of energization of relay 17, but is held closed through closed contacts 8 of relay 3. Contacts 15 then remain closed and hold the reset clutch of timer 18. This will maintain the open circuit to the transmitter plate voltage relay 11 through the open upper contact of 10, timer 18 holding switch 10 in its operated position until such time as the relay 1 releases relays 3 and 13 to open contacts 15 so that timer 18 can return switch 10 to its unoperated, illustrated position. Contacts 9 are open at this time, since the reset clutch of timer 19, which operates these contacts, is held through closed contacts 8 of relay 3. Plate voltage relay 11 is effectively open-circuited under these conditions.

Thus, if the control circuit is "locked on" the sampling circuit of this invention interrupts the energization circuit of the plate voltage relay and maintains the transmitter off until the control circuit is released.

In order to provide for uninterrupted carrier transmission, should the operator initiate a new transmission prior to the end of the five-minute timing cycle of limiting timer 18, an additional shorter interval adjustable reset timer 19 is cycled with each operation of relay 3 through its contacts 8, which when closed by relay 3 connect timer 19 to the alternating current source. Timer 19 may have a time interval of one minute, for example. Timer 19 controls contacts 9, which in their normal unoperated illustrated position are closed and in parallel with the normal unoperated illustrated position of contacts 10. Since timer 19 is cycled (started) with each energization of relay 3, the circuit of transmitter plate voltage relay 11 is maintained through closed contacts 9 for a definite time (a maximum of one minute, the timing interval of timer 19) from the beginning of each transmission cycle, the timer 19 being reset (and contacts 9 being returned to the closed position, in the event they have been opened) at the end of the transmission cycle by the opening of contacts 8 of relay 3.

Thus, the operator might initiate a new transmission from the unattended transmitter shortly (one minute or less) before the end of the five-minute timing interval of timer 18; even though the timer 18 opens the upper contact of switch 10 at the end of its timing interval, the circuit to plate voltage relay 11 will be maintained through contacts 9 and the transmitter will radiate carrier uninterruptedly, provided of course that the length of this new transmission is one minute or less from the time that relay 3 is energized to start transmission and to cycle timer 19, since one minute after transmission starts timer 19 finishes its cycle and opens its contacts 9, if contacts 8 are closed at that time. In standard mobile communications practice most transmissions without the carrier being interrupted are for reasonably short intervals (such as 45 to 50 seconds), so that the one-minute time interval of timer 19 (before its contacts 9 open) allows ample leeway for transmissions at times which overlap the end of the five-minute timing cycle of timer 18.

In the event of a "locked" control circuit (where relays 1 and 3 have become continuously energized due to circuit failure or to a spurious control signal not originated by the normal controlling source), timer 19, since it has a timing interval of only one minute, will open its contacts 9 considerably ahead of the opening of contacts 10 by timer 18. In the "locked" control circuit case, contacts 8 are of course closed so that timer 19 opens its contacts 9 one minute after the closure of contacts 8. Under "locked" control circuit conditions, therefore, contacts 9 are open long before the end of the cycle of timer 18, which occurs five minutes after relay 13 first closes its contacts 15. Contacts 9 being open at the end of this five-minute "given interval," the plate voltage relay 11 is effectively open-circuited, de-energizing the same and turning off the transmitter, when timer 18 opens the upper contact of switch 10. The carrier-off or transmitter-off condition is then maintained until the control circuit, including relays 1 and 3, is released to de-energize such relays. The opening of contacts 8 of relay 3 resets timer 19 to close its contacts 9 and set up a circuit through the coil of plate power relay 11, while the opening of contacts 7, of course, positively breaks the circuit through such coil. The opening of contacts 6 causes de-energization of relay 13 and the opening of its contacts 15 to reset the timer 18, since at this time (subsequent to the end of the timing cycle of timer 18) switch 10 is closed on its lower contact to energize relay 17 and open contacts 16. When timer 18 is reset, switch 10 is again closed on its upper contact to set up a parallel circuit through the coil of relay 11.

If contacts 9 of timer 19 are closed because of a desired transmission at the end of the five-minute sampling cycle (when timer 18 operates switch 10), in which event relays 1 and 3 are of course energized, the sampling device 18, 10, 16, etc. interprets this as a "locked on" condition of the control circuit. Relay 13 is then not de-energized to reset timer 18 but is held closed through closed contacts 6 of relay 3, as long as relay 3 is energized. When relay 3 is released or de-energized at the end of the desired transmission, opening of its contacts 6 causes deenergization of relay 13 to open its contacts 15, resetting timer 18. At the same time, the opening of contacts 7 of relay 3 de-energizes the transmitter power relay 11 and the opening of contacts 8 of this relay resets timer 19.

Of course, if the desired transmission lasts long enough after the end of the five-minute sampling cycle for the timer 19 to complete its one-minute timing period, contacts 9 of timer 19 are opened and, since the upper contact of switch 10 is then open (timer 18 having completed its timing period and the contacts 15 of relay 13 being closed, relay 13 still being energized through closed contacts 6), the transmitter plate relay 11 will be positively de-energized and the transmitter cut off, even though contacts 7 of relay 3 are still closed. In this latter event, the transmitter will remain off, and the relays and timers will not be reset, until relays 1 and 3 are de-energized at the end of the desired transmission.

It is desired to be pointed out that, with the circuit of this invention, it is impossible to have a single continuous transmission longer than the five-minute timing period of timer 18. Under continuous transmission conditions of this length, relay 3 would be energized (and its contacts 8 closed) so that contacts 9 of timer 19 would be open, timer 19 having completed its one-minute timing period. Since contacts 9 are then open, contacts 10 of timer 18 would definitely open the circuit to transmitter relay 11 at the end of the five-minute timing cycle of timer 18, even though contacts 7 of relay 3 are still closed.

However, this five-minute limitation on continuous transmission is not important in mobile communications, for which the circuit of this invention is particularly adapted, since in such communications there is never any continuous transmission lasting that long. The circuit of this invention is particularly suitable for use in the general field of mobile communications for the protection of unattended remotely located transmitters, where there is no need for long-sustained continuous transmission. Considering the fact that in standard mobile communications practice most communications last from 45 to 50 seconds maximum without the carrier being interrupted, one of the unique features of this invention is that the circuit is automatically reset to sample a new cycle (by the normally-occurring release of relay 13 and resetting of timer 18) at the end of a five-minute period which may cover a group of transmissions, five minutes being the timing interval of timer 18. In standard "press-to-talk" communication practice, substantially continuous transmissions of more than five minutes could be effected with the circuit of this invention by a momentary release of the control circuit just prior to the conclusion of the five-minute sampling period, thereby establishing a new sampling cycle at the end of the five-minute sampling period through the release of relay 13 and resetting of timer 18.

It should be undertsood that the invention may be used in any field of communication (except where continuous transmission exceeding five minutes is desired) where it is desired to prevent an unattended radio transmitter from continuously operating due to failure of a control device or to control signals not originating at the normal controlling source.

Generally, the relays 1 and 11 constitute part of a transmitter with which the invention (consisting of the remainder of the relay circuit illustrated) is to be used. In this case, of course, the coil voltages and frequencies of relays 3, 13 and 17 should be the same as those of the coil of plate power relay 11, so that the same common source of relay voltage can be used for all relays, with the possible exception of relay 1. For timing purposes, obviously the alternating current source 20, which supplies power to timers 18 and 19, should be the standard 60-cycle commercial source.

What is claimed is:

1. In a system for energizing a controlled device at a location, a first relay, a circuit or causing energization of said relay in response to the presence of a signal at said location and for causing de-energization of said relay in response to the absence of a signal thereat, a second relay adapted to be energized in response to the energization of said first relay, a time interval measuring device connected to be energized in response to the energization of said second relay, a pair of normally-closed contacts controlled by said measuring device, said contacts being opened by said measuring device at the end of the time interval measured thereby, a third relay for energizing said controlled device, an energization circuit for said third relay including in series said pair of contacts and a pair of contacts closed by the energization of said first relay, a holding circuit for said second relay including in series a pair of contacts closed by the energization of said second relay and a pair of normally-closed contacts, and means operated by said measuring device at the end of its time interval for causing opening of said last-named pair of contacts.

2. In a system for energizing a controlled device at a location, a first relay, a circuit for causing energization of said relay in response to the presence of a signal at said location and for causing de-energization of said relay in response to the absence of a signal thereat, a second relay adapted to be energized in response to the energization of said first relay, a first time interval measuring device connected to be energized in response to the energization of said second relay, a pair of normally-closed contacts controlled by said measuring device, said contacts being opened by said measuring device at the end of the time interval measured thereby, a second time interval measuring device connected to be energized in response to the energization of said first relay, the time interval measured by said second measuring device being shorter than that measured by said first measuring device, a pair of normally-closed contacts controlled by said second measuring device, said last-named contacts being connected in parallel with the first-named contacts and being opened by said second measuring device at the end of the time interval measured thereby, a third relay for energizing said controlled device, an energization circuit for said third relay including the parallel combination of said first-named and second-named contacts in series with a pair of contacts closed by the energization of said first relay, between a source and said third relay, a holding circuit for said second relay including in series a pair of contacts closed by the energization of said second relay and a pair of normally-closed contacts, and means operated by said first measuring device at the end of its time interval for causing opening of said last-named pair of contacts.

3. In a system for energizing a controlled device at a location, a first relay, a circuit for causing energization of said relay in response to the presence of a signal at said location and for causing de-energization of said relay in response to the absence of a signal thereat, a second relay, an energization circuit for said second relay which is completed in response to the energization of said first relay, a time interval measuring device, means responsive to the energization of said second relay for causing energization of said measuring device, a pair of normally-closed contacts controlled by said measuring device, said contacts being opened by said measuring device at the end of the time interval measured thereby, a third relay for energizing said controlled device, an energization circuit for said third relay including in series said pair of contacts and a pair of contacts closed by the energization of said first relay, a fourth relay having a pair of normally-closed contacts, a holding circuit for said second relay including in series a pair of contacts closed by the energization of said second relay and the contacts of said fourth relay, and an energization circuit for said fourth relay completed by the operation of said measuring device at the end of its time interval.

4. In a system for energizing a controlled device at a location, a first relay, a circuit for causing energization of said relay in response to the presence of a signal at said location and for causing de-energization of said relay in response to the absence of a signal thereat, a second relay, an energization circuit for said second relay which is completed in response to the energization of said first relay, a first time interval measuring device, means responsive to the energization of said second relay for causing energization of said measuring device, a pair of normally-closed contacts controlled by said measuring device, said contacts being opened by said measuring device at the end of the time interval measured thereby, a second time interval measuring device, means responsive to the energization of said first relay for causing energization of said second measuring device, the time interval measured by said second measuring device being shorter than that measured by said first measuring device, a pair of normally-closed contacts controlled by said second measuring device, said last-named contacts being connected in parallel with the first-named contacts and being opened by said second measuring device at the end of the time interval measured thereby, a third relay for energizing said controlled device, an energization circuit for said third relay including the parallel combination of said first-named and second-named contacts in series with a pair of contacts closed by the energization of said first relay, between a source and said third relay, a fourth relay having a pair of normally-closed contacts, a holding circuit for said second relay including in series a pair of contacts closed by the energization of said second relay and the contacts of said fourth relay, and an energization circuit for said fourth relay completed by the operation of said first measuring device at the end of its time interval.

5. In a system for controlling an electrical device, a two-condition electrical-signal-responsive controlling means responsive to an electrical signal effective thereon for controlling the device in one or the other of two opposite senses corresponding respectively to each of said two conditions, means responsive to the operation of said controlling means to one of said two conditions for measuring a predetermined time interval beginning at the instant of initiation of control in said one sense of said device by said controlling means, and switching means controlled by said measuring means for sampling the condition of said controlling means at the end of said time interval and for operating to control said device in said other sense if said controlling means is in one condition when sampled and for operating to reset itself and also said measuring means if said controlling means is in the other condition when sampled.

6. In a system for energizing an electrical device, a two-condition electrical-signal-responsive controlling means for controlling the device, said means being placed in a first condition for energizing said device in response to the presence of an electrical signal and being placed in a second condition for de-energizing said device in response to the absence of an electrical signal, means responsive to the placing of said controlling means in said first condition for measuring a predetermined time interval beginning at the time of energization of said device by said controlling means, and switching means controlled by said measuring means for sampling the condition of said controlling means at the end of said time interval and for operating to de-energize said device if said controlling means is in said first condition when sampled and for operating to reset itself and also said measuring means if said controlling means is in said second condition when sampled.

7. In a system for controlling an electrical device, a two-condition electrical-signal-responsive controlling means responsive to an electrical signal effective thereon for controlling the device in one or the other of two opposite senses corresponding respectively to each of said two conditions, a first means responsive to the operation of said controlling means to one of said two conditions for measuring a predetermined first time interval beginning at the first initiation of control in said one sense by said controlling means, a second means responsive to the operation of said controlling means to said one condition for measuring a smaller predetermined second time interval beginning at the instant of each initiation of control in said one sense by said controlling means, and switching means controlled by said first measuring means for sampling the condition of said controlling means at the end of said first time interval and for operating to control said device in said other sense if said controlling means is in one condition when sampled and if said second measuring means has measured out its time interval when sampling occurs and for operating to reset itself and also said first measuring means if said controlling means is in the other condition when sampled.

8. In a system for energizing an electrical device, a two-condition electrical-signal-responsive controlling means for controlling the device, said means being placed in a first condition for energizing said device in response to the presence of an electrical signal and being placed in a second condition for de-energizing said device in response to the absence of an electrical signal, a first means responsive to the placing of said controlling means in said first condition for measuring a predetermined first time interval beginning at the time of a first energization of said device by said controlling means, a second means responsive to the placing of said controlling means in said first condition for measuring a smaller predetermined second time interval beginning at the time of each energization of said device by said controlling means, and switching means controlled by said first measuring means for sampling the condition of said controlling means at the end of said first time interval and for operating to de-energize said device if said controlling means is in a said first condition when sampled and if said second measuring means has measured out its time interval when sampling occurs and for operating to reset itself and also said first measuring means if said controlling means is in said second condition when sampled.

9. In a system for energizing an electrical device, a two-condition electrical-signal-responsive controlling means for controlling the device, said means being placed in a first condition for energizing said device in response to the presence of an electrical signal and being placed in a second condition for de-energizing said device in response to the absence of an electrical signal, means for measuring a predetermined time interval beginning at a certain instant, circuit means controlled by said controlling means for causing energization of said measuring means in response to the placing of said controlling means in said first condition, whereby said measuring means measures its time interval from the instant of energization of said device by said controlling means, and switching means controlled by said measuring means for sampling the condition of said controlling means at the end of said time interval and for operating to deenergize said device if said controlling means is in said first condition when sampled and for operating to reset itself and also said measuring means if said controlling means is in said second condition when sampled.

10. In a system for energizing an electrical device, a two-condition electrical-signal-responsive controlling means for controlling the device, said means being placed in a first condition for energizing said device in response to the presence of an electrical signal and being placed in a second condition for deenergizing said device in response to the absence of an electrical signal, a first means for measuring a predetermined first time interval beginning at a certain instant, circuit means controlled by said controlling means for causing energization of said measuring means in response to a first placing of said controlling means in said first condition, whereby said measuring means measures its time interval from the instant of a first energization of said device by said controlling means, a second means for measuring a smaller predetermined second time interval beginning at a certain instant, circuit means controlled by said controlling means for causing energization of said second measuring means in response to each placing of said controlling means in said first condition, whereby said second measuring means measures its time interval from the instant of each energization of said device by said controlling means, and switching means controlled by said first measuring means for sampling the condition of said controlling means at the end of said first time interval and for operating to deenergize said device if said controlling means is in said first condition when sampled and if said second measuring means has measured out its time interval when sampling occurs and for operating to reset itself and also said first measuring means if said controlling means is in said second condition when sampled.

JOHN R. NEUBAUER.

References Cited in the file of this patent

UNITED STATES PATENTS

| Number | Name | Date |
|---|---|---|
| 1,342,635 | Lewis | June 8, 1920 |
| 1,763,390 | Davis | June 10, 1930 |
| 2,083,849 | Litstrom | June 15, 1937 |
| 2,094,733 | Byrnes | Oct. 5, 1937 |
| 2,339,750 | Bartholy | Jan. 25, 1944 |